United States Patent [19]

Marmorat et al.

[11] 4,323,750

[45] Apr. 6, 1982

[54] DEVICE FOR FEEDING, WITH ELONGATE LINING MATERIAL, AN INSTALLATION FOR LINING A TUBULAR MEMBER

[75] Inventors: Andre Marmorat, Le Creusot; Arnold-Michel Robert, Montchanin, both of France

[73] Assignee: Framatome, Courbevoie, France

[21] Appl. No.: 149,471

[22] Filed: May 9, 1980

[30] Foreign Application Priority Data

May 11, 1979 [FR] France ................... 79 12009

[51] Int. Cl.³ ........................... B23K 9/04; B23K 9/28
[52] U.S. Cl. ................... 219/76.1; 219/60 R; 219/137.2; 219/73.21; 228/41
[58] Field of Search ............... 219/60 R, 66, 73 R, 219/73.11, 73.21, 76.1, 76.14, 137.2, 137.7; 118/622, DIG. 10; 228/41

[56] References Cited

U.S. PATENT DOCUMENTS

| 2,866,078 | 12/1958 | Ballentine, Jr. et al. ...... 219/73 R X |
| 2,987,608 | 6/1961 | Handwerk et al. ............. 219/60 R |
| 3,024,349 | 3/1962 | Hinrichsen et al. ......... 219/73.21 X |
| 3,271,554 | 9/1966 | Johnson ..................... 219/73 R |
| 3,582,599 | 6/1971 | Yohn ........................ 219/60 R |
| 3,859,495 | 1/1975 | Takahashi et al. ........... 219/73 R X |

FOREIGN PATENT DOCUMENTS

| 2160830 | 6/1973 | Fed. Rep. of Germany .... 219/60 R |
| 51-06152 | 2/1976 | Japan ....................... 219/76.1 |
| 54-110152 | 8/1979 | Japan ........................ 219/66 |
| 55-50982 | 4/1980 | Japan ........................ 219/66 |
| 7110125 | 1/1973 | Netherlands .............. 219/137.7 |
| 252168 | 7/1926 | United Kingdom ............ 228/41 |

*Primary Examiner*—J. V. Truhe
*Assistant Examiner*—Keith E. George
*Attorney, Agent, or Firm*—Pollock, Vande Sande & Priddy

[57] ABSTRACT

The invention relates to a device for feeding, with elongate lining material, an installation for lining a tubular member such as a pipe having a diameter of the order of 650 to 1,000 mm, particularly in the nuclear industry. The pipe is placed with its axis horizontal on a support which enables it to be rotated about its axis. The lining installation comprises a vertical welding head which is mounted on the end of a horizontal arm, the position of which is adjustable to introduce the welding head into the pipe. The elongate lining material is supplied to the welding head by a feed device comprising a reel on which the lining material is wound, and which is arranged at the front of the welding head. The reel is mounted so as to rotate on an axle fixed relative to the end of the arm and whose axis forms a small angle with the axis of the arm. The device also comprises adjustable means for guiding the lining material from a low part of the reel to an upper part of the welding head.

5 Claims, 2 Drawing Figures

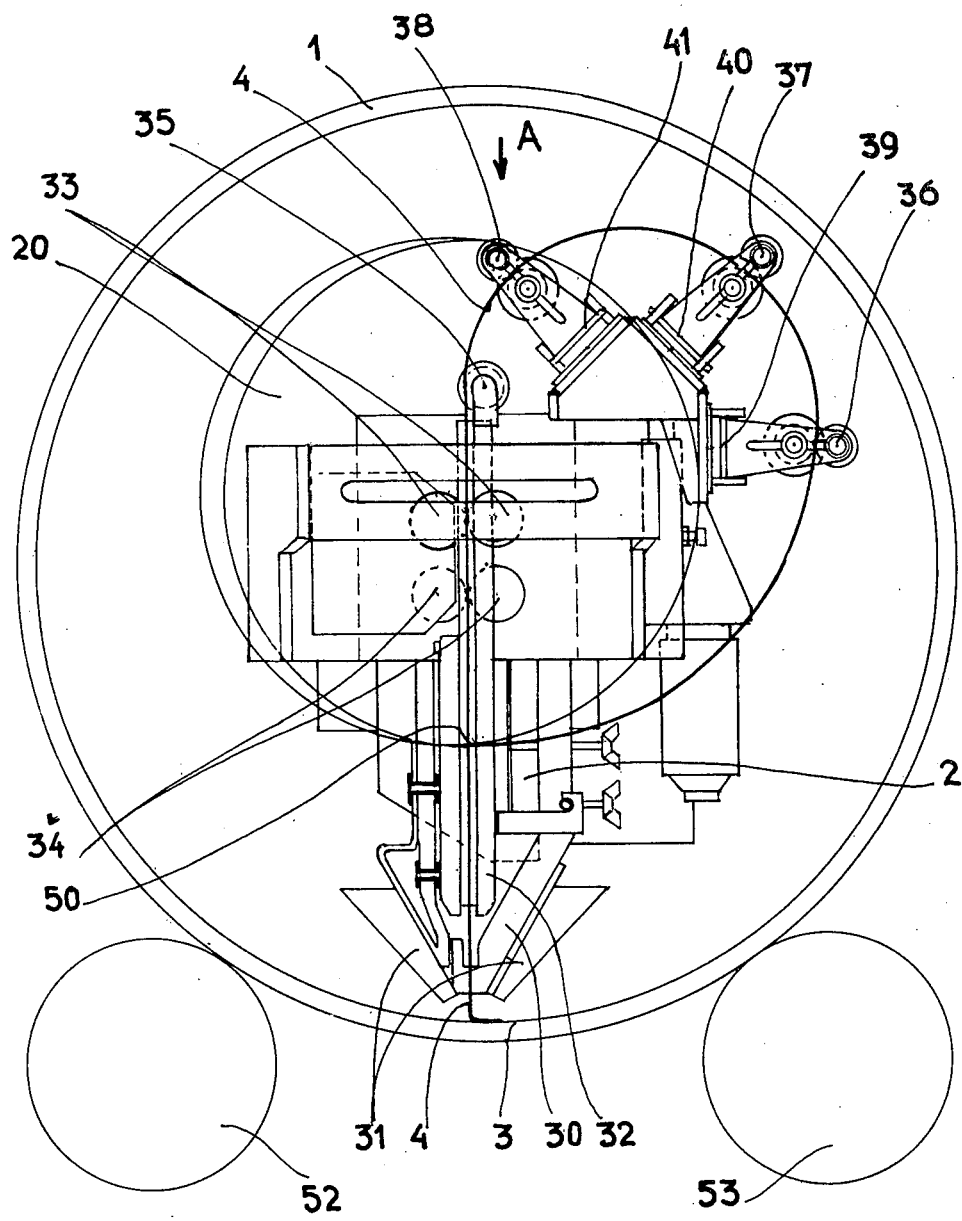

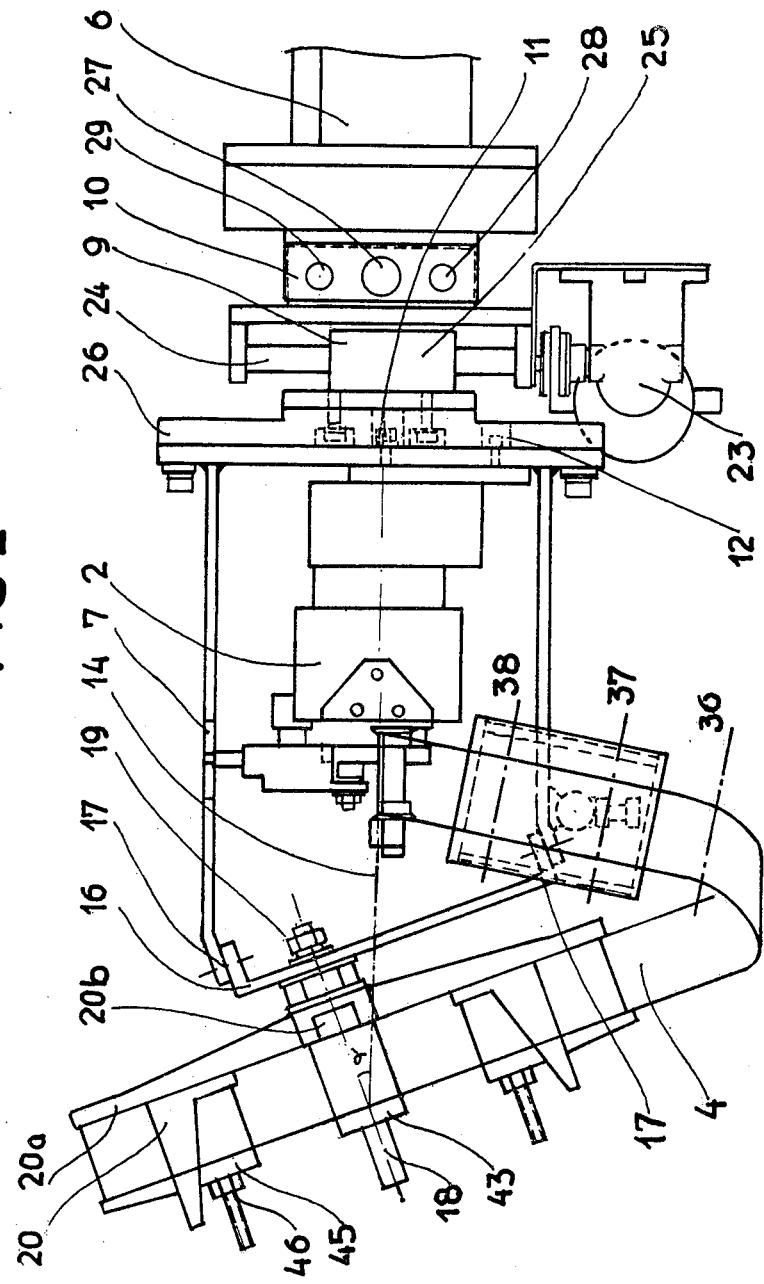

DEVICE FOR FEEDING, WITH ELONGATE LINING MATERIAL, AN INSTALLATION FOR LINING A TUBULAR MEMBER

The invention relates to a device for feeding, with elongate lining material, an installation for lining a tubular member such as a pipe having a diameter of 650 to 1,000 mm.

Pipe lining installations using elongate lining material, for example in the form of a ribbon, are known and these installations comprise a welding head which is introduced into the pipe and which is carried by an arm enabling the welding head to move in the direction of the axis of the pipe in order to produce a lining by means of successive passes during which the pipe performs one complete rotation, the lining material, which is continuously supplied to the welding head during a pass, forming a ring of lining on the internal surface of the pipe.

In particular, in the field of the nuclear industry, it is necessary to line with stainless steel pipes or tubes which are used for conveying fluids at high temperature and at high pressure, such as the pressurized water in the cooling circuit of water-cooled nuclear reactors, or for conveying corrosive fluids.

To manufacture these pipes, elementary shells of lightly alloyed steel are used and these are lined with stainless steel in order to render them resistant to corrosion by water under pressure and at high temperature, or by other corrosive fluids.

In order to produce these pipe elements, a lining installation such as those mentioned above are used, the welding head of which is continuously fed with stainless steel ribbon.

The pipes used in the field of the nuclear industry, which must be lined with stainless steel, generally have a diameter of less than 1 meter, and this presents problems as regards the bulk of the welding head used and the bulk of the ribbon-feeding device which is associated therewith.

For pipes of very large diameter, it is possible to arrange the reel, on which the lining ribbon is wound, above the welding head, the ribbon entering vertically into the welding head and being guided and driven along in the vertical direction to the welding zone which is at the lowest part of the pipe to be lined, the pipe being rotated about its axis.

In the case of pipes having diameters of less than 1 meter, it is no longer possible to adopt an arrangement in which the reel of ribbon is above the welding head, and the arrangement then used is one in which the reel is mounted on that part of the arm which remains outside the pipe during the lining operation, the ribbon travelling from the reel to the welding zone along the horizontal arm or parallel to this arm.

In travelling over the whole length of the arm or over a large part of this length, the ribbon is guided by means of rollers which can cause deformations or breaks in the long length of material during its transportation.

If the long length of material suffers a breakage, it is obviously necessary to stop the lining operation in order to re-engage the long length of material in the welding head. This detracts from the speed of execution of the operation.

Furthermore, if this long length of material is deformed, such deformations can cause variations in dimensional, geometric or metallurgical characteristics of the lining. In this case, it is necessary to carry out additional grinding or machining operations after the lining has been produced.

It is an object of the invention to provide a device for feeding, with elongate lining material, an installation for lining a tubular member having a diameter of the order of 650 to 1,000 mm and which is arranged with its axis horizontal on a support enabling it to be rotated about its axis, said device comprising a horizontal arm mounted for vertical and horizontal translational motion and one end of which is introduced into the tubular member during the lining operation, a vertical welding head mounted on one end of the arm and provided with means for guiding and carrying the elongate material along a path which has a vertical direction until the lining material is brought into contact with the internal surface of the tubular member to be welded to this surface at a lower part of the tubular member during the rotation of the tubular member about its horizontal axis, the feed device making it possible to avoid deformations and breakages of the elongate material, whilst at the same time being of low bulk inside the the tubular member.

For this purpose, the device according to the invention comprises:

a reel on which the elongate material is wound mounted in front of said welding head, that is to say on that side of said welding head closer to the end of the tubular member opposite that through which said welding head is introduced, said reel being mounted for rotation on an axle made fast with the front end of said arm and forming a small angle with the axis of said arm and adjustable means for guiding the elongate material from a lower zone of said reel to an upper part of said welding head along a path which is adapted to the width and to the flexibility of the elonate material and terminates in a vertical path for introducing the elongate material into said means for guiding and carrying in said welding head.

An embodiment of a device according to the invention will now be described, by way of example only, in relation to a pipe which is to be lined by a stainless steel ribbon.

In the drawings:

FIG. 1 is a view in elevation in the axial direction of a pipe, showing a welded head and an embodiment of a device according to the invention in operative position in the pipe, the reel of elongate lining material being shown solely by its contour; and FIG. 2 is a plan view of the welding head and device of the lining installation, in the direction of the arrow A of FIG. 1.

FIG. 1 shows a pipe 1, inside which a welding head 2 is arranged the head 2 bringing an elongate lining material in the form of a stainless steel ribbon 4 into contact with the internal surface 3 of the pipe and fixing it to the surface 3 by welding.

With reference to FIGS. 1 and 2, it is seen that the welding head 2 is fixed by means of screws, such as 11 and 12, to a support 7 which is mounted by means of two sliding supports 9 and 10 on the end of an arm 6.

The arm 6, in the form of a slide, is mounted so that it can undergo translational motion, in the direction of its axis 14 and in the vertical direction, on a support (not shown) consisting of a bracket which enables the arm 6 to undergo vertical movements of large amplitude and to undergo horizontal movements in the direction of the axis 14 of the arm in successive steps having an amplitude of the order of the width of the ribbon.

The front part of the support 7, that is to say the part facing that end of the pipe element which is opposite the end through which the welding head is introduced into the pipe, comprising a member in the form of a plate 16 fixed to the end of the support 7 by means of screws 17 such that it is possible to adjust the orientation of the plate relative to the support 7 and hence relative to the arm 6, in order to adjust the orientation of the axis of an axle 18 rigidly fixed to the end plate 16 of the support 7.

The axle 18 is fixed to the support 7 by means of a nut 19 and carries a reel 20 on which the ribbon 4 is wound. It can be seen that adjusting the orientation of the end plate 16 of the support 7 relative to the support 7 and to the arm 6, causes an adjustment of the orientation of the reel 20 relative to the arm 6. In practice, this adjustment of orientation consists in rotating the axle 18 of the reel 20 about the axis 14 of the arm. In all its positions, the axle 18 forms a small angle with the axis 14 of the arm 6.

By adjusting the orientation of the plate 16, it is possible to obtain a variation in the inclination of the faces of the reel, relative both to the vertical plane and to the horizontal plane passing through the axis of the arm. These angles of inclination are generally different from 90°.

Furthermore, the sliding supports 9 and 10 make it possible to adjust the position of the welding head and of the reel relative to the arm 6. The slide 9 makes it possible to adjust the welding head relative to the arm 6 in the transverse direction, that is to say in the horizontal direction perpendicular to the axis of the arm. This adjustment is carried out by means of a motor 23 which drives a screw 24 which is engaged with a support member 25 made integral with the fixing plate 26 of the support 7.

Similarly, the sliding support 10, comprising two guide columns 28 and 29, is caused to undergo vertical translational motion by means of a screw 27 driven by a motor.

In this manner, the transverse position and the vertical position of the welding head and of the reel 20 can be precisely adjusted inside the pipe from a control station of the lining installation.

The welding head 2 comprises a conductive end piece or member 30, which ensures electrical contact with the strip 4 during its application and its welding to the internal surface 3 of the pipe. At the level of the member 30, the welding head also comprises two flux-dispensing cups 31 which are arranged at the level of the zone which is in the course of being welded. These cups are fed with welding flux from a flux reservoir under air pressure, which is located at that end of the arm which is opposite the end carrying the welding head introduced into the pipe. A pipe brings the welding flux, consisting of particles containing a high percentage of silicate, to the dispensing cups by means of the compressed air which conveys the flux particles.

The welding head also comprises a channel 32 for guiding the ribbon and two pairs of drive rollers 33 and 34 engaging the ribbon during its passage through the welding head in the vertical direction. The rollers 33 and 34 are connected to a motor-reducer by which they are rotated in order to move the ribbon inside the welding head.

At its upper part at which the ribbon 4 arrives, the welding head also comprises a deflection roller 35 for guiding the ribbon 4 as it enters the welding head.

Apart from the reel 20 which is mounted so as to rotate on the axle 18, the device for feeding the welding head with ribbon comprises three sets of guide rollers 36, 37 and 38, which are mounted on supports made integral with the support 7 of the welding head and the reel 20, by means of axles 39, 40 and 41, about which the sets of rollers 36, 37 and 38, respectively, can be orientated in accordance with the dimensional geometric and elastic characteristics of the ribbon. The ribbon 4 passes between the rollers of each of the set of rollers 36, 37 and 38.

The reel 20 comprises two arms, such as 20a, 20b shown in FIG. 2, at 90° which arms are made integral with a bearing 43 rotating on the axle 18. Each of the arms 20a and 20b of the reel carries a structure 45 for holding the ribbon and which comprises rods 46 at each of its ends for adjusting the holding structure in accordance with the width of the ribbon.

In this manner, the roll of ribbon is held on the reel 20, and the ribbon 4 can only unwind when the end of the ribbon is pulled by the drive devices 33 and 34, which then cause the reel to rotate.

The ribbon 4 is guided from the lower part or zone 50 of the reel 20 to the roller 35, which constitutes the upper part of the welding head, by the three sets of rollers 36, 37 and 38.

These guide devices are positioned so that the strip unwinds from the zone 50 of the reel. FIGS. 1 and 2 show that the ribbon 4 describes a loop, the lower part of which is tangential to the lower zone 50 of the reel, and the upper part of which is tangential to the vertical plane passing through the axis 14 of the arm 6.

The orientation of the reel, which is adjusted by adjusting the position of the axle 18, and the adjustment of the roller devices 36, 37 and 38, make it possible to adjust the shape of the loop produced by the ribbon between the reel and the welding head, in accordance with the characteristics of the ribbon.

With reference to FIG. 1, it is seen that the bulk of the unit, comprising the welding head and the reel, in a transverse plane is very low, relative to the corresponding bulk of a device in which the reel would be located above the welding head.

During a ribbon-welding operation for lining the pipe 1, the pipe which is arranged on drive rollers 52 and 53 with its axis horizontal, is caused to rotate about its axis at a slow speed corresponding to the speed of welding on the internal surface 3.

At the same time as the pipe is rotated, the roller-type drive devices 33 and 34, associated with the welding head, are caused to rotate so as to unwind the ribbon at a linear speed which enables deposition on the internal surface of the pipe to be carried out. In this manner, the ribbon 4 passes through the conductor member 30 and is melted onto the internal surface of the pipe. This melting takes place under electroconductive solid flux supplied by the cups 31 in the welding zone.

When a complete rotation of the pipe has been performed, the rotational movement of the pipe and the driving of the rollers 33 and 34, bringing the ribbon into the welding zone, are interrupted simultaneously.

The arm 6 is then caused to move horizontally towards that zone of the pipe which has not yet been lined, and the next pass is started by again causing the rotation of the pipe 1 by means of the rollers 52 and 53, and by moving the ribbon by causing the rollers 33 and 34 to rotate. The arm 6 is moved horizontally by an amplitude which is slightly less than the width of the ribbon, so as to cause slight overlapping of the different deposits. For example, in the case of a nuclear reactor pipe having a diameter of 660 mm, which is lined with a stainless steel ribbon having a width of 60 mm, the overlap of the successive deposits is 8 mm.

At the start of the lining operation, that end of the arm 6 which carries the welding head is caused to penetrate into the pipe through that end directed towards the lining installation, after the height of the arm on its support has been coarsely adjusted.

The precise positioning of the welding head in terms of height is then carried out by means of the sliding support 10, whilst the transverse adjustment of the welding head is carried out by means of the sliding support 9.

It is seen that the main advantages of the above described device according to the invention are that the bulk of the device and of the welding head in the transverse direction, relative to the axis of the pipe, are reduced and that the ribbon can be introduced into the welding head without the ribbon undergoing deformations or breakages, it being possible for the ribbon to be guided so that the loop constituting its path between the reel and the welding head has a sufficiently large radius of curvature, in accordance with the geometric and mechanical characteristics of the ribbon.

However, the invention is not intended to be limited to the embodiment which has been described above, but comprises all variants thereof. Thus, it is possible to envisage a method of fixing, devices for adjusting the position of the reel and devices for guiding the ribbon, which are different from those which have been described.

The invention is applicable not only to a welding head of the type which has been described, but also to any other welding head, regardless of the type of conductor and regardless of the type of welding carried out.

Furthermore the invention is applicable not only to the case of welding a lining material in the form of a ribbon, but also to the case of the welding any other elongate material, such as, for example, a wire or any other flexible material which can be transported over a path in the shape of a loop, with passage from a winding plane to an offset position in the direction perpendicular to this winding plane.

The invention is applicable not only to the lining of pipes for use in the field of the nuclear industry, but generally to the lining of any pipe or other tubular part used in any sector of industry.

What is claimed is:

1. A device for feeding, with elongate lining material, an installation for lining a tubular member having a diameter of the order of 650 to 1,000 mm and which is arranged with its axis horizontal on a support enabling it to be rotated about its axis, said device comprising a horizontal arm mounted for vertical and horizontal translational motion and one end of which is introduced into the tubular member during the lining operation; a vertical welding head mounted on said one end of said arm and provided with means for guiding and carrying the elongate lining material along a path which has a vertical direction until the lining material is brought into contact with the internal surface of the tubular member to be welded to the internal surface thereof at a lower part of the tubular member during the rotation of the tubular member about its horizontal axis; a reel on which the elongate material is wound mounted in front of said welding head, that is to say on that side of said welding head closer to the end of the tubular member opposite that through which said welding head is introduced, said reel being mounted for rotation on an axle made fast with the front end of said arm and forming a small angle with the axis of said arm; and adjustable means for guiding the elongate material from a lower zone of said reel to an upper part of said welding head along a path which is adapted to the width and to the flexibility of the elongate material and terminates in a vertical path for introducing the elongate material into said means for guiding and carrying in said welding head.

2. A device according to claim 1, comprising an end member mounted on said arm and to said axle of said reel is rigidly fixed said end member comprising means for adjusting the orientation thereof relative to said arm for varying the orientation of said reel relative to said welding head.

3. A device according to claim 1 or claim 2, comprising slide means mounting said reel on said arm for adjusting the vertical position and transverse position of said reel relative to said arm.

4. A device according to claim 3, wherein said elongate material is a ribbon and said adjustable guiding means comprise sets of rollers between which the ribbon passes and arranged such that the ribbon is held and guided in said path thereof in the shape of a loop.

5. A device according to claim 1 or claim 2, wherein said elongate material is a ribbon and said adjustable guiding means comprise sets of rollers between which the ribbon passes and arranged such that the ribbon is held and guided in said path thereof in the shape of a loop.

* * * * *